United States Patent [19]

Scott et al.

[11] 4,079,201

[45] Mar. 14, 1978

[54] ELECTRONIC TELEPHONE CALL TIMER

[76] Inventors: Gerald F. Scott, 4212 Barrett Ave., Richmond; Michael B. Corp, Sr., 4039 Merced St., Baldwin Park, both of Calif. 91706

[21] Appl. No.: 773,867

[22] Filed: Mar. 3, 1977

[51] Int. Cl.² .......................................... H04M 1/21
[52] U.S. Cl. .............................. 179/7.1 R; 179/2 TC; 179/1 HS; 58/152 T
[58] Field of Search ............ 179/2 TC, 7.1 R, 7.1 TP, 179/7 R, 8 A, 6.31, 1 HS; 58/152 T, 145 K

[56] References Cited

U.S. PATENT DOCUMENTS

| | | | |
|---|---|---|---|
| 3,320,366 | 5/1967 | Plummer | 179/7.1 TP |
| 3,512,355 | 5/1970 | Lang | 179/7.1 R |
| 3,538,258 | 11/1970 | Zuckerman | 179/7.1 R |
| 3,769,463 | 10/1973 | Graham et al. | 179/7.1 TP |
| 3,801,745 | 4/1974 | Zuckerman | 179/7.1 R |
| 3,806,652 | 4/1974 | Woolf et al. | 179/7.1 R |
| 3,982,073 | 9/1976 | Baltzer et al. | 179/7.1 TP |

*Primary Examiner*—Kathleen H. Claffy
*Assistant Examiner*—Gerald L. Brigance
*Attorney, Agent, or Firm*—Townsend and Townsend

[57] ABSTRACT

An electronic telephone call timing system for providing both individual and cumulative call timing for a dedicated telephone.

The device includes a call timer and display unit for generating a visible indication of the elapsed time of an individual call interval, a cumulative timer and display unit for generating a visible indication of the cumulative use time of the associated telephone, a power supply unit for generating a reference supply voltage, a gated clock signal train and a reference frequency signal from an AC line source, and a telephone off-hook sensor unit coupled to the power supply unit and the call timer and display unit for generating a gated reference frequency signal and a gated reset signal in response to the receiver being placed in an off-hook condition. The call timer and display unit includes circuitry responsive to the generation of the gated reset signal for initializing a counter contained therein.

11 Claims, 11 Drawing Figures

ELECTRONIC TELEPHONE CALL TIMER

BACKGROUND OF THE INVENTION

This invention relates to telephone call timing systems and more particularly to electronic devices for providing an indication of the total elapsed time of a telephone call, a cumulative total indicating length of use of a telephone over a predetermined interval (e.g. a day, a week, a month), or both.

Devices are known which are employed to measure the length of time of an individual phone call from a given telephone, the acumulated usage on a time basis of the telephone, and a combination of both. U.S. Pat. No. 3,512,335, for example, discloses an electromechanical device having a pair of clock displays for timing the length of an individual phone call and for accumulating the total length of telephone usage over a fourteen-day interval. While devices of this type may be useful, they are primarily mechanical in nature and thus require a relatively large number of mechanical components which are prone to ordinary wear and ultimate failure. In addition, such devices employing mechanical components are relatively large in size and somewhat cumbersome, so as to be unsuitable for use in those applications where space is at a premium. Further, such devices rely upon mechanical cooperation with the telephone receiver for proper actuation and thus must be physically designed to be mechanically cooperable with a telephone handset of a particular design. Accordingly, several different models of such devices are required, each mechanically conformable with a different type of telephone handset, e.g. the conventional desk handset, the wall hanging model, and other models such as the PRINCESS telephone, special console models, and the like.

SUMMARY OF THE INVENTION

The invention comprises a fully electronic telephone timing system which is compatible with all telephone handsets for sensing off-hook status of the receiver, which provides both individual and cumulative call timing for a dedicated telephone, and which is rugged in construction, compact in size and highly reliable in operation.

In the preferred embodiment of the invention, a power supply powered by AC line voltage supplies a DC reference voltage and a gated clock signal to an individual call timer and display unit and a cumulative timer and display unit. The power supply also provides a half wave rectified reference signal at the line frequency to a telephone off-hook sensor circuit which gates this signal back to the power supply as a square wave signal whenever the telephone receiver is off-hook. This gated square wave signal provides the time base from which the gated clock signal is generated by the power supply. The reference DC voltage from the power supply is also coupled through the telephone off-hook sensor to the individual call timer and display unit in such a manner that a reset signal for the latter unit is automatically generated whenever the telephone receiver hook switch is activated by removing the receiver from the cradle.

Both the call timer and display unit and the cumulative timer and display unit are each provided with a counter responsive to the gated clock reference signal for measuring the off-hook time of the telephone, the call timer being reset at the beginning of each telephone call and the cumulative timer and display unit counter storing the total telephone usage. Each of the call timer and display unit and the cumulative timer and display unit further includes a digit and segment driver to which the decoded outputs of the counter are coupled for driving an individual digital display unit. Preferably, the cumulative timer and display unit digital display includes seconds, minutes, hours, tens and hundreds of hours.

A manually operable reset circuit is also coupled to both the call timer and display unit and the cumulative timer and display unit for permitting both units to be manually reset when desired.

In a first embodiment the telephone off-hook sensor comprises a light source, such as a light-emitting diode and a light sensor, such as a phototransistor, mutually positioned so that the sensor receives light emanating from the source and reflected by a preselected portion of the telephone receiver when the receiver is in the on-hook position. The receiver is provided with a highly reflective element, such as a small strip of reflective tape, which is simply adhered to the surface of the preselected portion. In an alternate embodiment, the source and sensor are mutually positioned so that the sensor receives light emanating from the source directly, and an opaque shutter is attached to the receiver and intercepts the source - sensor light path when the receiver is in the on-hook position.

For a fuller understanding of the nature and advantages of the invention, reference should be had to the ensuing detailed description taken in conjunction with the accompanying drawings.

DESCRIPTION OF THE PREFERRED EMBODIMENTS

Figure 1:
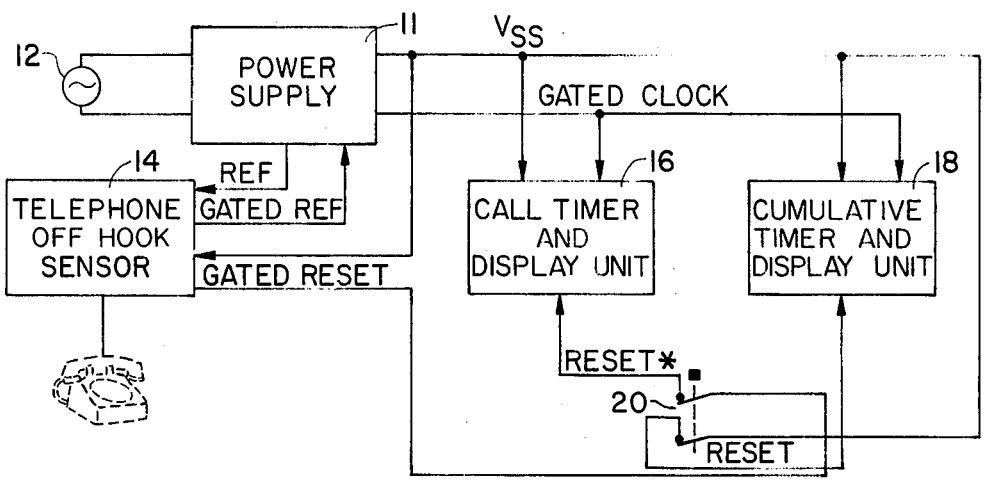
FIG. 1 is a block diagram illustrating the preferred embodiment of the invention.

Turning now to the drawings, FIG. 1 is a block diagram of the preferred embodiment of the invention. As seen in this Fig., a power supply 11 is coupled to a source of AC line voltage 12 and produces three different output signals: $V_{ss}$, GATED CLOCK and REF. $V_{ss}$ is a reference DC voltage required to operate the remaining block elements comprising the invention; GATED CLOCK is a 60 HZ clock pulse train furnished as a reference to the timer and display units described below; and REF is a 60 HZ, half wave rectified reference signal which is coupled to a telephone off-hook sensor unit 14. The reference DC voltage $V_{ss}$ is also coupled to a separate input of telephone off-hook sensor unit 14.

Unit 14 is designed to be operatively associated with a conventional telephone handset and is responsive to the telephone reciever being placed in the off-hook condition. When this condition obtains, the REF signal is gated back to the power supply 11 as a frequency standard (GATED REF) for generating the GATED CLOCK signal train, and a reset signal (GATED RESET) is generated from the $V_{ss}$ reference voltage which is coupled via a switch 20 (described below) to the call timer and display unit 16 as RESET* signal to reset unit 16 to a zero count state.

Call timer and display unit 16 is responsive to the application of $V_{ss}$ reference voltage and GATED CLOCK signal train to display the instantaneous elapsed time of a telephone call, beginning with the instant that the receiver is placed in the off-hook condition. Cumulative timer and display unit 18 is similar to unit 16 and displays the instantaneous total elapsed use time of the dedicated telephone handset measured in each period between placing the receiver in the off-hook condition and replacing the receiver to the on-hook condition. A double pole double throw two-position, normally-closed push-button manual reset switch 20 is also provided which enables manual resetting of units 16 and 18 at appropriate intervals, e.g. during initial installation or after the end of a predetermined accounting period.

Figure 2:
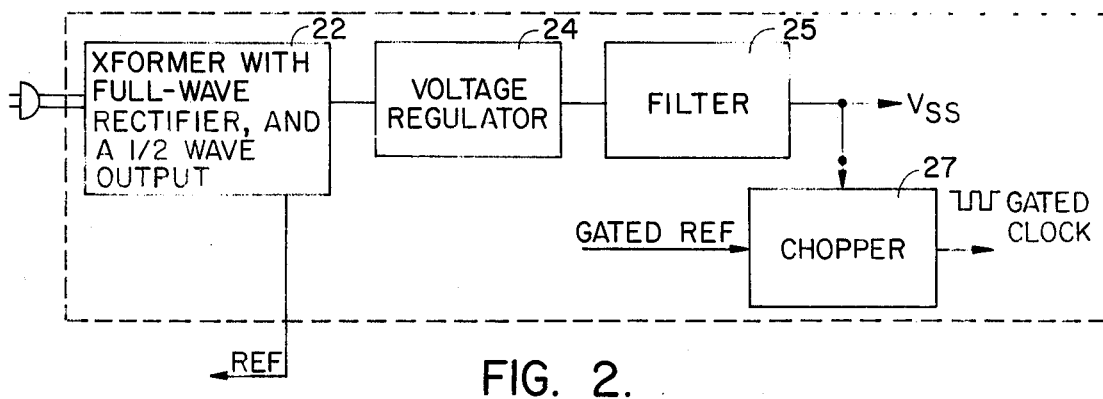
FIG. 2 is a block diagram of the power supply of FIG. 1.
Figure 5:
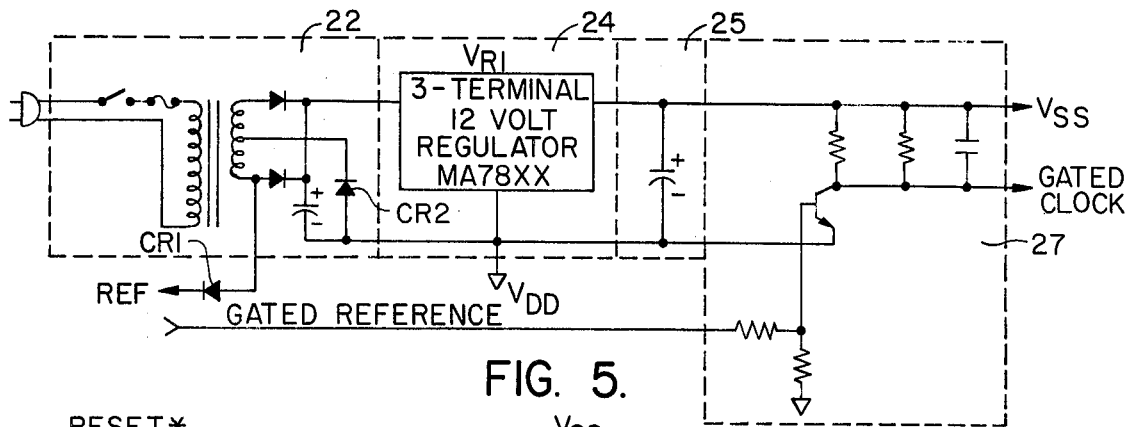
FIG. 5 is a partial circuit schematic of the power supply.

With reference to FIG. 2, power supply 11 includes a transformer provided with a half wave output (CR1, CR2 of FIG. 5) for generating the REF signal, and a full wave rectifier circuit for generating a DC voltage. This DC voltage is coupled via a voltage regulator 24 to a filter 25 for smoothing out fluctuations therein. The output $V_{ss}$ of filter 25 is coupled to the reference voltage input of a 60 HZ chopper circuit 27, and is also coupled to units 14 16, 18 and 20 of FIG. 1. The remaining input to chopper circuit 27 is the GATED REF signal from telephone off-hook sensor 14. The circuit elements corresponding to subunits 22, 24, 25 and 27 of the power supply are illustrated in FIG. 5.

Figure 3:
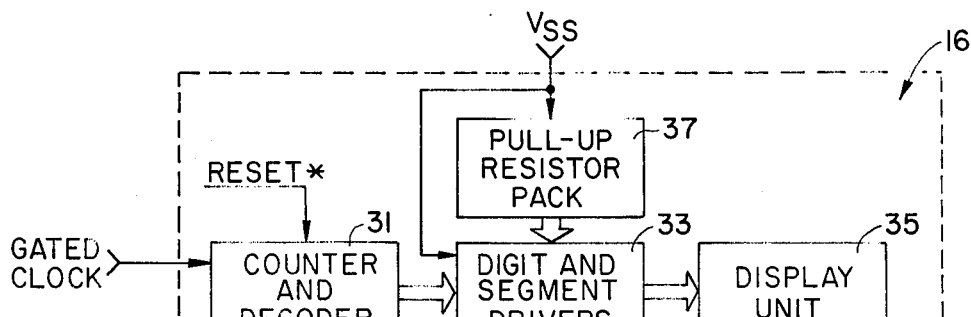
FIG. 3 is a block diagram of the call timer and display unit of FIG. 1.
Figure 6:
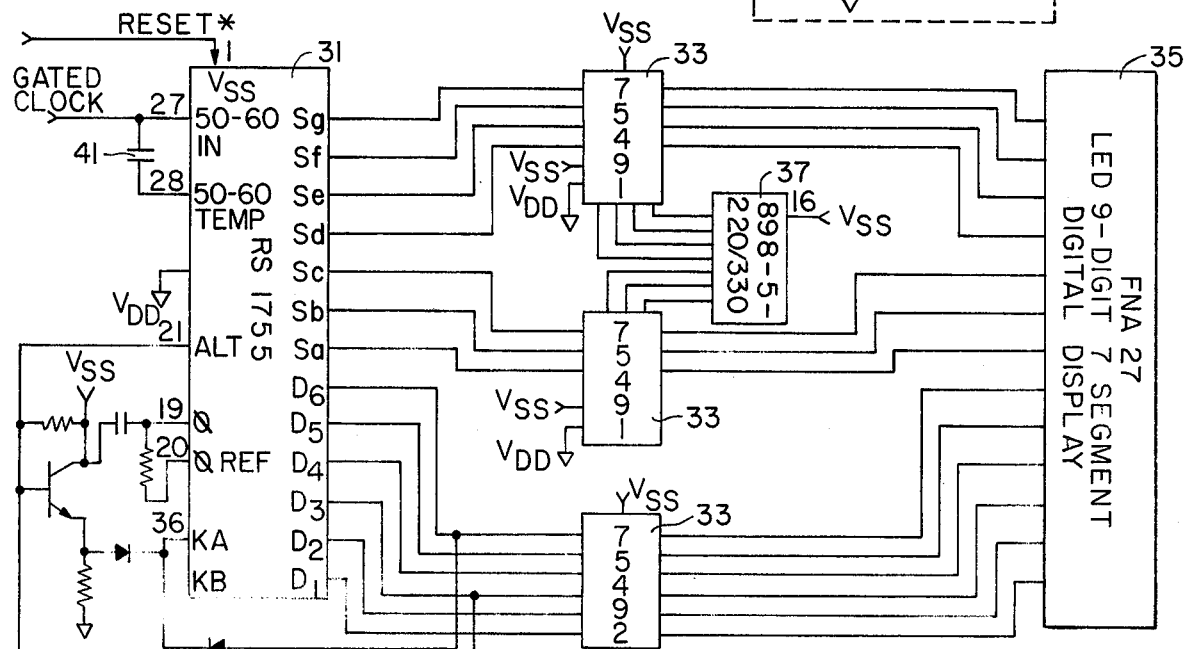
FIG. 6 is a partial circuit schematic of the call timer and display unit.

With reference to FIG. 3, call timer and display unit 16 includes a counter and decoder 31 having a clock input to which the gated clock signals are supplied from power supply 11 and also RESET* input to which the signal from switch 20 is supplied. The decoded outputs of counter-decoder 31 are coupled to a digit and segment driver unit 33, the outputs of which are coupled to a display unit 35. A pullup resistor pack 37 is coupled to the segment driver portion of unit 33 to ensure proper operation of these elements upon the application of supply $V_{ss}$ thereto. The circuit elements employed in the preferred embodiment for call timer and display unit 16 are illustrated in detail in FIG. 6. With reference to this figure, it is noted that resetting of the counter-decoder 31 is accomplished in the preferred embodiment by momentarily interrupting the supply voltage $V_{ss}$ to the CLOCK-ON-A-CHIP integrated circuit 31, preferably a type RE-1755 device sold by Radio Shack. It is further noted, that the CLOCK-ON-A-CHIP circuit 31 is provided with an internal clock reference standard capable of generating a 60 HZ signal which is coupled through capacitor 51 to the normal clock input in the event of a power failure of appreciable duration. Alternate equivalents, e.g. a standby battery power pack, may be employed for this purpose, as desired.

Figure 4:
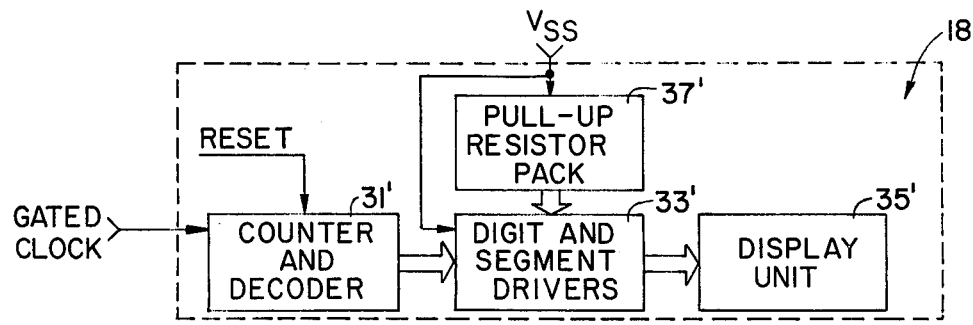
FIG. 4 is a block diagram of the cumulative timer and display unit of FIG. 1.
Figure 7:
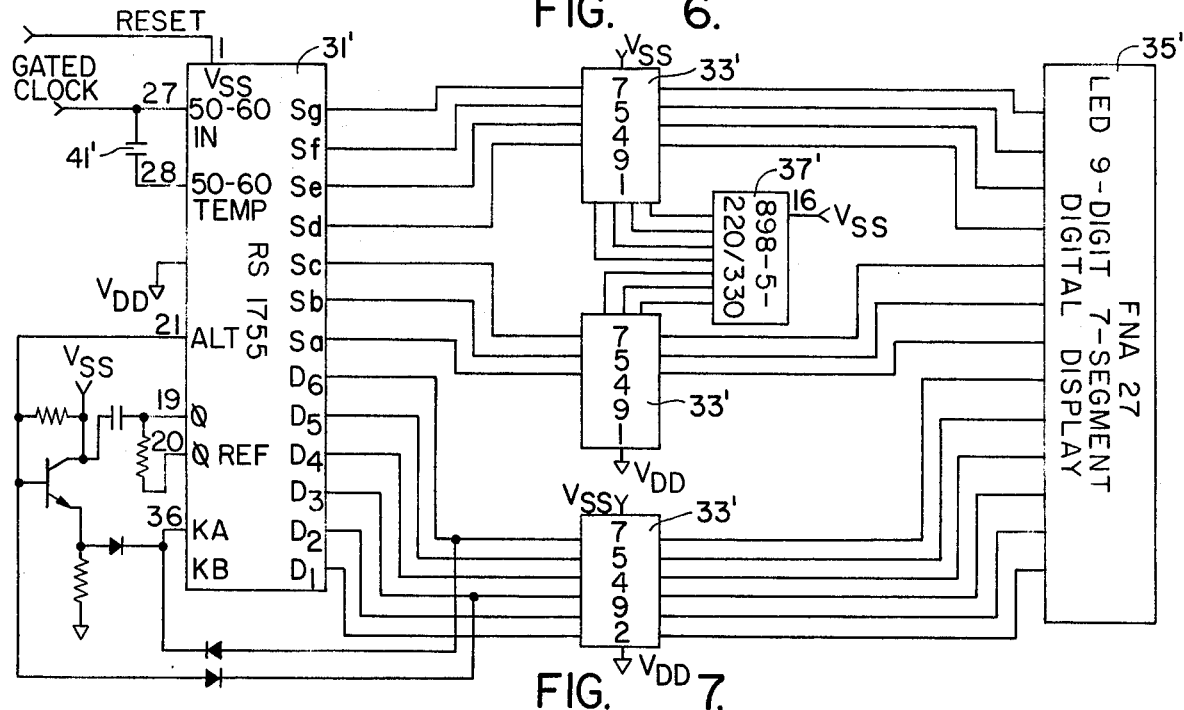
FIG. 7 is a partial circuit schematic of the cumulative timer and display unit.

With reference to FIG. 4, the cumulative timer and display unit 18 includes a counter-decoder 31', a digit and segment driver unit 33', a display unit 35' and a pullup resistor pack 37', all of which are essentially identical to elements 31, 33, 35 and 37. It should be noted that counter-decoder 31' is provided with $V_{ss}$ reference voltage via switch 20 (FIG. 1), rather than via telephone off-hook sensor 14, so that automatic resetting does not occur when the receiver is placed in the off-hook condition. The circuit elements employed in the preferred embodiment of cumulative timer and display unit 18 are illustrated in FIG. 7.

Figure 8:
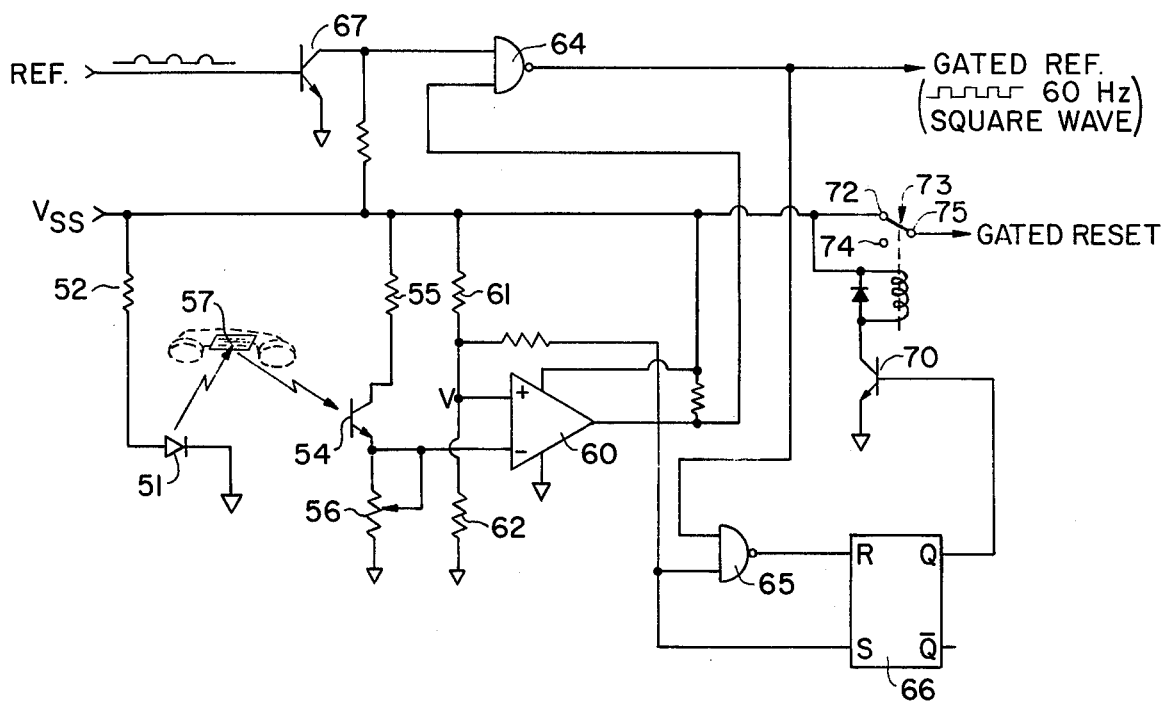
FIG. 8 is a circuit schematic of a first embodiment of an OFF-HOOK Sensor.

With reference to FIG. 8, telephone off-hook sensor unit 14 includes a light source 51, which preferably comprises an infrared light-emitting diode, coupled via resistor 52 to supply voltage $V_{ss}$ and coupled directly to ground. Source 51 generates light radiation continuously when power is applied to unit 14. A photo-transistor 54 is coupled to supply voltage $V_{ss}$ via resistor 55 and to ground via variable resistor 56. Photo-transistor 54 is arranged in such a position that light emanating from source 51 and reflected from reflective element 57 is intercepted thereby. Reflective element 57 is adhered preferably to the underside of the telephone receiver and may comprise any known substance having a high co-efficient of reflectivity for light of the wave length generated by source 51, such as a small strip of aluminized Mylar, a small mirror or the like. The emitter of transistor 54 is coupled to the negative input of a conventional operation amplifier 60, the positive input terminal of which is biased to a predetermined threshold level by means of resistors 61, 62.

The output of amplifier 60 is coupled to a first input of a first NAND gate 64, a first input of a second NAND gate 65 and the set input of a flip-flop 66, preferably an R-S type flip-flop. The remaining input to NAND gate 64 is obtained from the collector of a transistor 67 having a grounded remitter, and the REF signal from power supply 11 is coupled to the base of transistor 67. The output of gate 64 comprises the gated REF signal. This signal is also coupled to the remaining input of gate 65, the output of which is coupled to the reset input of flip-flop 66.

The Q output of flip-flop 66 coupled is coupled to the base of a transistor 70 having a grounded emitter and a collector coupled to a first end of a relay coil 71. The remaining end of relay coil 71 is coupled to a first terminal 72 of a single pole double throw switch 73. Terminal 72 is also coupled to supply voltage $V_{ss}$. Terminal 74 of switch 73 has no connection, and terminal 75 furnishes the GATED RESET signal to switch 20 of FIG. 1.

In operation, with supply voltage $V_{ss}$ applied to unit 14, and the telephone handset on the on-hook position, light radiation from source 51 is reflected by element 57 onto photo-transistor 54, causing this latter element to conduct and maintain the magnitude of the voltage at the negative input terminal to amplifier 60 above the magnitude of the steady-state voltage applied to the positive input terminal of amplifier 60, so that the output signal therefrom lies below the threshold voltage to unblock gates 64, 65. With gate 64 blocked, the REF signal applied to the base of transistor 67 is not conducted through the gate 64. Flip-flop 66 is initially in the reset state, and transistor 70 is non-conducting, so that no current passes through relay coil 71 and switch 73 is in the position illustrated in which supply voltage $V_{ss}$ is applied to switch 20.

When the telephone receiver is lifted off-hook, the reflective path from source 51 to element 57 and photo-transistor 54 is interrupted with the result that transistor 54 is rendered non-conductive thereby lowering the magnitude of the voltage applied to the negative input terminal of amplifier 60 substantially to ground potential. The output of amplifier 60 changes to a positive voltage of sufficient magnitude to unblock gate 64 which permits the square wave signal appearing at the collector of transistor 67 to pass through gate 64 back to the power supply unit 11. At the same time flip-flop 66 is set by the positive transition of the signal at the output of amplifier 60, thereby rendered transistor 70 conductive which operates relay coil 71. When relay coil 71 is operated, the blade of switch 73 is moved to the alternate position of contact with terminal 74, thereby interrupting the application of supply voltage $V_{ss}$ to switch 20 and causing the RESET* signal to be applied to call timer and display unit 16 to reset this unit. Thereafter, the square wave GATED REF signal output from gate 64 transitions to the zero logic level which causes gate 65 to generate a positive transition thereby resetting flip-flop 66. When flip-flop 66 is reset, transistor 70 is rendered non-conductive and relay coil 71 is de-energized, thereby permitting the movable blade of switch 73 to return to the position it illustrated.

When the telephone receiver is again placed in the on-hook position, the light path is restored, transistor 54 is rendered conductive, and gates 64 and 65 are once again disabled. Further operation proceeds in the manner described above.

Light source 51 and transistor 54 may be conveniently mounted in a small housing and adhered to the telephone handset housing on the top surface thereof between the receiver cradle. For other forms of telephone handsets, source 51 and receptor 54 may be conveniently located in any desired manner to accomplish the same result.

Figure 9:
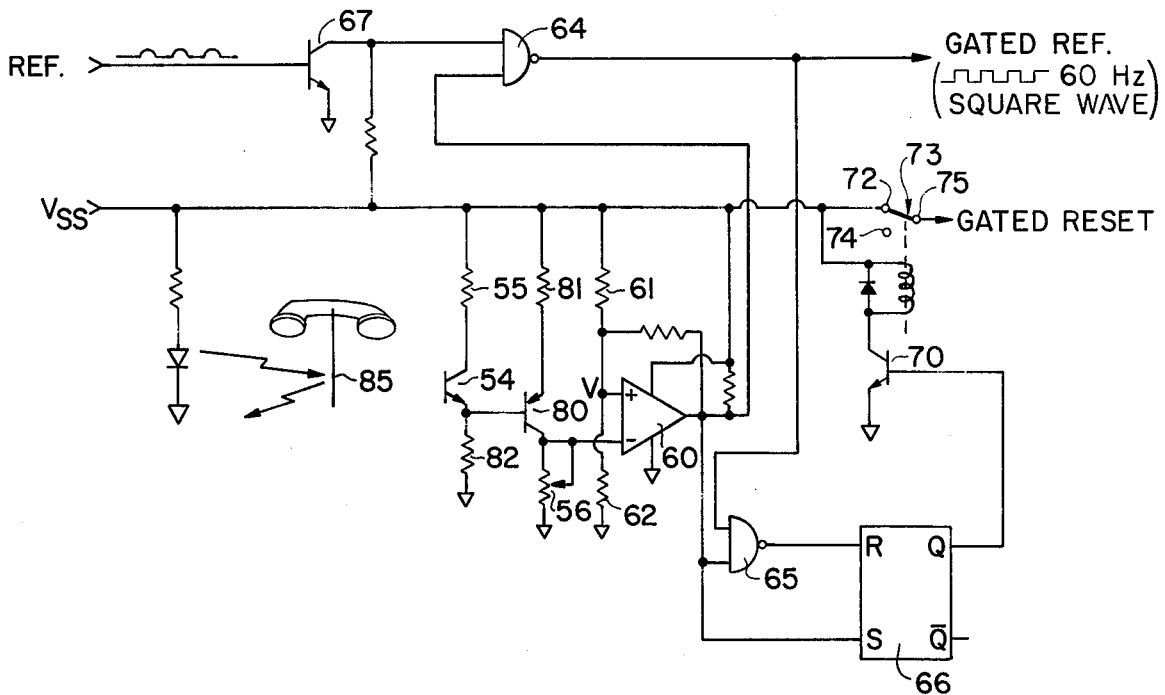
FIG. 9 is a circuit schematic of an alternate embodiment of an OFF-HOOK Sensor.
Figure 10:
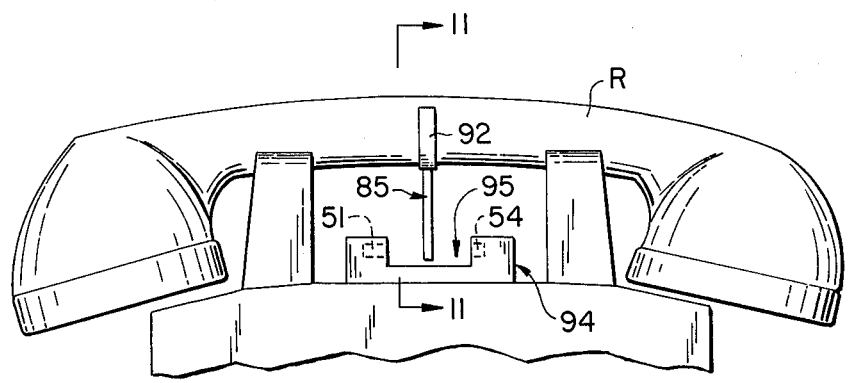
FIG. 10 is a partial front elevational view of a shutter-sensor assembly for use with the circuit of FIG. 9.
Figure 11:
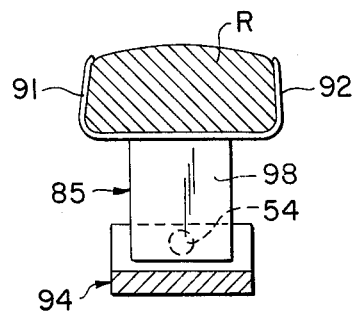
FIG. 11 is a partial sectional view taken along lines 11—11 of FIG. 10.

FIG. 9 illustrates alternate circuitry for use with the photo-mechanical arrangement illustrated in FIGS. 10 and 11. The circuitry of FIG. 9 is essentially similar to the circuitry of FIG. 8. However, an additional transistor 80 is included having a base coupled to the emitter of transistor 54, and emitter coupled via resistor 81 to supply voltage $V_{ss}$, and a collector coupled to the negative input terminal of amplifier 60. Variable resistor 56 is also coupled to the collector of transistor 80, and the emitter of transistor 54 is coupled to ground through resistor 82.

In operation, with the telephone receiver in the on-hook position, a shutter 85 is normally interposed between source 51 and photo-transistor 54, so that the latter element is rendered non-conductive. With transistor 54 non-conductive, transistor 80 is biased to the conductive state and supplied a voltage of appropriate magnitude to the negative input terminal of amplifier 60. When the telephone receiver is removed from the cradle, shutter 85 is withdrawn from the path between source 51 and transistor 54, the latter element receives radiation from source 51 and is rendered conductive, which renders transistor 80 nonconductive. The operation of the remaining portion of the circuitry of FIG. 9 is substantially identical to that described above the reference to FIG. 8.

FIGS. 10 and 11 illustrate the arrangement of source 51, sensor 54 and shutter 85 on a conventional telephone handset. As seen in these FIGS., shutter 85 includes a blade portion 90 fabricated from a material which is opaque to the radiation emitted by source 51, and a pair of clip members 91, 92 which enable shutter 85 to be removably attached to the telephone receiver R. Source 51 and sensor 54 are mounted in mutual alignment in a housing 94 having a slotted portion 95 into which shutter 85 extends when the receiver R is in the on-hook position. Shutter 85 and housing 94 are preferably fabricated from a suitable plastic material.

In use, with AC power applied to power supply 11, reference voltage $V_{ss}$ and the reference frequency signal REF are present on their respective output lines from power supply 11. If the telephone receiver is on-hook, no GATED REF signals are coupled back to power supply 11 and thus no GATED CLOCK signals are supplied to unit 16, 18. Cumulative timer and display unit 18 displays the total accumulated telephone use time to that instant, while call timer and display unit 16 displays the total telephone use time for the last preceding call.

When the telephone receiver is placed in the off-hook condition, the GATED REF signals are coupled back to power supply 11 and the GATED CLOCK signal train is coupled to units 16, 18 thereby causing the counter portions thereof to accumulate the telephone use time. In addition, when the receiver is placed in the off-hook condition, the RESET Signal is coupled to unit 16, thereby causing the counter portion thereof to reset to zero before beginning to count in response to the GATED CLOCK Signals. When the receiver is again placed on-hook, the GATED REF Signals vanish with the result that the GATED CLOCK Signals are no longer generated. At this time, the accumulated counts in both units 16 and 18 are displayed. When the telephone receiver is again placed in an off-hook condition, the operation of the circuitry proceeds in the manner described above.

During initial installation, and after periodic samples are taken of the total accumulated count in unit 18, it is usually desirable to reset the counter portions of units 16 and 18 to zero. This may be accomplished by operation of manual reset switch 20, which momentarily interrupts the circuit path for reference voltage $V_{ss}$ to units 16, 18, causing a return to a display of "zero" on both displays.

Since the invention may be fabricated from conventional, commercially available electronic hardware, much of which is available in integrated circuit form, the units are extremely small in physical size, low in cost and highly reliable in operation. Further, since the AC line voltage provides the frequency standard for the counting process, no separate oscillator circuit is required, which contributes to the low cost of devices constructed in accordance with the teachings of the invention. In addition, since the telephone off-hook sensor 14 is responsive to the status of the telephone handset in an electrical manner, the invention may be coupled to a wide variety of telephone handsets of different physical and mechanical design and is fully compatible therewith.

While the above provides a full and complete disclosure of the preferred embodiments of the invention, various modifications, alternate constructions and equivalents may be employed without departing from the true spirit and scope of the invention. For example, all elements of unit 16 or unit 18 may be incorporated into a single integrated circuit. Therefore, the above description and illustrations should not be construed as limiting the scope of the invention which is defined by the appended claims.

What is claimed is:

1. A timing and display unit for use with an individual telephone set having a receiver and a hook switch cradle and for providing an indication of the elapsed time of individual call intervals and an indication of the cumulative use time of said telephone set, said unit comprising:
   power supply means for generating a reference supply voltage, a gated clock signal train and a reference frequency signal from an AC line source, said power supply means having a gated reference frequency signal input terminal;
   call timer and display means coupled to said power supply means for generating a visible indication of the elapsed time of an individual call interval, said call timer and display means including a first counter;
   cumulative timer and display means coupled to said power supply means for generating a visible indication of the cumulative use time of said telephone set, said cumulative timer and display means including a second counter; and
   telephone off-hook sensor means including a source of electromagnetic radiation and a radiation sensitive element positioned to detect the presence or absence of said receiver on said cradle and having first and second input terminals coupled to said reference frequency signal and said reference supply voltage, respectively, and first and second input terminals coupled to said gated reference frequency signal input terminal of said power supply means and
   said call timer and display means, respectively, for generating said gated reference frequency signal and a gated reset signal in response to said receiver being placed in an off-hook condition,
   said call timer and display means including means responsive to the generation of said gated reset signal for initializing said first counter.

2. The combination of claim 1 wherein said call timer and display means first counter includes a supply voltage input terminal coupled to said reference supply voltage and a clock input terminal coupled to said gated clock signal train, and wherein said call timer and display means further includes means for decoding the individual states of said first counter, digit driver means having a plurality of inputs coupled to said decoder means and a plurality of outputs, and digital display means having a plurality of input terminals coupled to said output terminals of said driver.

3. The combination of claim 1 wherein said second counter has a reference voltage input terminal coupled to said reference supply voltage and a clock input terminal coupled to said gated clock signal train, and wherein said cumulative timer and display means further includes means for decoding the individual states of said second counter, digit driver means having a plurality of inputs coupled to said decoder means and a plurality of outputs, and digital display means having a plurality of input terminals coupled to said output terminals of said driver.

4. The combination of claim 1 wherein said power supply means includes means for converting said AC line source to a relatively low level DC voltage, means for generating said reference frequency signal as a half wave rectified signal whose frequency is equal to that of said AC line source, and chopper circuit means for generating said gated clock signal train from said gated reference frequency signal as a square wave signal.

5. The combination of claim 1 further including a manually operable switch means coupled to said reference supply voltage, said second output terminal of said sensor means and said first and second counter for enabling manual resetting of said first and second counters to an initial state.

6. The combination of claim 1 wherein said reference frequency signal, said gated reference frequency signal and said gated clock signal train each have a frequency equal to the frequency of said AC line source.

7. The combination of claim 1 wherein said call timer and display means and said cumulative timer and display means each includes a digital display device.

8. The combination of claim 7 wherein said digital display device comprises a plurality of seven segment light-emitting diode display units.

9. The combination of claim 1 wherein said source of electromagnetic radiation and said radiation sensitive element are mutually positioned so that radiation emitted from said source is received by said radiation sensitive element after reflection from a portion of said receiver.

10. The combination of claim 9 wherein said source comprises a light-emitting diode.

11. The combination of claim 1 wherein said radiation sensitive element is positioned to receive radiation from said source in a direct path, and wherein said unit further includes shutter means opaque to said radiation and adapted to intercept said radiation along said path when said receiver is in the on-hook position.

* * * * *